US012570865B2

(12) United States Patent
Nakashima et al.

(10) Patent No.: US 12,570,865 B2
(45) Date of Patent: *Mar. 10, 2026

(54) ACTIVE ENERGY RAY-CURABLE INKJET PRINTING INK COMPOSITION

(71) Applicant: SAKATA INX CORPORATION, Osaka (JP)

(72) Inventors: Okinori Nakashima, Osaka (JP); Takuya Myose, Osaka (JP); Jun Kawabata, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 604 days.

This patent is subject to a terminal disclaimer.

(21) Appl. No.: 18/005,132

(22) PCT Filed: Jul. 8, 2021

(86) PCT No.: PCT/JP2021/025774

§ 371 (c)(1),
(2) Date: Jan. 11, 2023

(87) PCT Pub. No.: WO2022/024704

PCT Pub. Date: Feb. 3, 2022

(65) Prior Publication Data

US 2023/0257608 A1     Aug. 17, 2023

(30) Foreign Application Priority Data

Jul. 29, 2020    (JP) ................................. 2020-128738

(51) Int. Cl.
| | |
|---|---|
| *C08F 2/46* | (2006.01) |
| *C08F 2/50* | (2006.01) |
| *C08G 61/04* | (2006.01) |
| *C09D 11/101* | (2014.01) |
| *C09D 11/107* | (2014.01) |
| *C09D 11/38* | (2014.01) |
| *B41J 2/01* | (2006.01) |

(52) U.S. Cl.
CPC ............ *C09D 11/38* (2013.01); *C09D 11/101* (2013.01); *C09D 11/107* (2013.01); *B41J 2/01* (2013.01)

(58) Field of Classification Search
CPC ..... C09D 11/107; C09D 11/38; C09D 11/322; C09D 11/101; B41J 2/01
USPC ............... 522/8, 7, 6, 189, 184, 71, 1; 520/1
See application file for complete search history.

(56) References Cited

U.S. PATENT DOCUMENTS

| | | | | |
|---|---|---|---|---|
| 12,297,363 | B2 * | 5/2025 | Nakashima ............ | C09D 11/32 |
| 2011/0236647 | A1 | 9/2011 | Tsuchiya et al. | |
| 2018/0127606 | A1 | 5/2018 | Illsley | |
| 2018/0371276 | A1 | 12/2018 | Miyano | |

| | | | |
|---|---|---|---|
| 2019/0085196 | A1 | 3/2019 | Illsley et al. |
| 2023/0287229 | A1 | 9/2023 | Nakashima et al. |
| 2024/0093048 | A1 | 3/2024 | Nakashima et al. |

FOREIGN PATENT DOCUMENTS

| | | | |
|---|---|---|---|
| EP | 4190566 A1 | 6/2023 | |
| EP | 4190567 A1 | 6/2023 | |
| JP | 2008507598 A | 3/2008 | |
| JP | 2009035650 A | 2/2009 | |
| JP | WO2007074768 A1 | 6/2009 | |
| JP | 2018168321 A | 11/2018 | |
| JP | 2018188581 A | 11/2018 | |
| JP | 2019056111 A | 4/2019 | |
| JP | 2020100777 A | 7/2020 | |
| WO | 2006085992 A2 | 8/2006 | |
| WO | 2007074768 A1 | 7/2007 | |
| WO | 2009148124 A1 | 12/2009 | |
| WO | 2016186838 A1 | 11/2016 | |
| WO | 2017073654 A1 | 5/2017 | |
| WO | 2017160784 A1 | 9/2017 | |

OTHER PUBLICATIONS

Extended European Search Report (EESR) dated Jul. 19, 2024, issued for European counterpart patent application No. EP21848874.0 (6 pages).
International Search Report (ISR) mailed Sep. 28, 2021, issued for International application No. PCT/JP2021/025774. (3 pages).
International Preliminary Report on Patentability, dated Jan. 31, 2023, for corresponding international application PCT/JP2021/025774 (1 page).
Notification Concerning Transmittal of International Preliminary Report on Patentability, mailed Feb. 9, 2023, for corresponding international application PCT/JP2021/025774 (1 page).
Notification of Transmittal of Translation of the International Preliminary Report on Patentability, mailed Feb. 9, 2023, for corresponding international application PCT/JP2021/025774 (1 page).

(Continued)

*Primary Examiner* — Jessica Whiteley
(74) *Attorney, Agent, or Firm* — Law Office of Katsuhiro Arai

(57) ABSTRACT

An active energy ray-curable inkjet printing ink composition satisfies (A) to (E) below, where the total content of (D) and (E) accounts for 30.0 to 60.0% by mass: (A) an acrylated amine compound having two photopolymerizable functional groups and two amino groups in a molecule is contained by 1.0 to 20.0% by mass; (B) alkoxy group-containing (meth) acrylate monomers are contained by 2.0 to 20.0% by mass; (C) a (meth)acrylate monomer containing an alkyl group with 10 to 20 carbon atoms is contained by 2.0 to 25.0% by mass; (D) at least one type selected from the group that consists of 1,6-hexanediol diacrylate, 3-methyl-1,5-pentanediol diacrylate, dipropylene glycol diacrylate, propoxylated(2)neopentyl glycol diacrylate, and hydroxypivalic acid neopentyl glycol diacrylate is contained by 5.0 to 25.0% by mass; and (E) a plant oil-derived 1,10-decanediol diacrylate is contained by 10.0 to 40.0% by mass.

20 Claims, No Drawings

(56)  References Cited

OTHER PUBLICATIONS

Written Opinion of the International Searching Authority, mailed
Sep. 28, 2021, for corresponding international application PCT/
JP2021/025774 (3 pages).

* cited by examiner

ACTIVE ENERGY RAY-CURABLE INKJET PRINTING INK COMPOSITION

CROSS-REFERENCE TO RELATED APPLICATIONS

This application is the U.S. National Phase under 35 U.S.C. § 371 of International Application PCT/JP2021/025774, filed Jul. 8, 2021, which claims priority to Japanese Patent Application No. JP2020-128738, filed Jul. 29, 2020. The International Application was published under PCT Article 21 (2) in a language other than English.

TECHNICAL FIELD

The present invention relates to an active energy ray-curable inkjet printing ink composition suitable for printing on such base materials as sheets made of paper or resin including vinyl chloride-based polymers and ethylene-vinyl acetate-based copolymers, but especially on cardboard sheets, as well as a printed matter obtained by using the same.

BACKGROUND ART

As described in Patent Literature 1, the problem of preventing the generation of curing wrinkles when active energy ray-curable inkjet inks are cured, is public knowledge.

Also, inkjet ink compositions containing an amine-modified oligomer as well as a monomer having multiple (meth) acryloyl groups, are public knowledge, as described in Patent Literature 2, for example. However, these ink compositions do not satisfy requirements C and D, which are discussed later, under the present invention, for example.

Additionally, biomass is drawing attention in recent years as a non-exhaustible industrial resource. Biomass is a "recyclable organic resource of biological origin excluding fossil resources." Meanwhile, development of biomass polymers using biomass as a raw material began in the 1980's for the purpose of environmental preservation. Biomass polymers are believed to provide an effective answer to preventing global warming, and are expected to be used as a material for various types of products such as moldings, fibers, nonwoven fabrics, packing media, toners, inks, paints, films, sheets, foams, coating agents, adhesives, etc.

In the field of active energy ray-curable inkjet printing for use on cardboard, active energy ray-curable inkjet inks using biomass, as well as active energy ray-curable inkjet inks generating very little odor while offering excellent bending tolerance property and rub resistance are also demanded.

BACKGROUND ART LITERATURE

Patent Literature

Patent Literature 1: International Patent Laid-open No. 2007/074768
Patent Literature 2: International Patent Laid-open No. 2017/073654

SUMMARY OF THE INVENTION

Problems to Be Solved by the Invention

An object of the present invention is to provide an active energy ray-curable inkjet printing ink composition using plant-derived materials, and another object is to provide an active energy ray-curable inkjet printing ink composition characterized by very little odor, low viscosity, excellent active energy ray curability, absence of curing wrinkles in the cured film, as well as excellent curability and bending tolerance property.

Means for Solving the Problems

After studying in earnest to achieve the aforementioned objects, the inventors of the present invention found that a specific compositional makeup would achieve the aforementioned objects, and completed the present invention.

To be specific, the present invention is described below.

1. An active energy ray-curable inkjet printing ink composition satisfying requirements (A) to (E) below, where the total content of the compounds in (D) and (E) accounts for 30.0 to 60.0% by mass in the active energy ray-curable inkjet printing ink composition:

(A) an acrylated amine compound having two photopolymerizable functional groups and two amino groups in a molecule is contained by 1.0 to 20.0% by mass in the active energy ray-curable inkjet printing ink composition;

(B) alkoxy group-containing (meth)acrylate monomers are contained by 2.0 to 20.0% by mass in the active energy ray-curable inkjet printing ink composition;

(C) a (meth)acrylate monomer containing an alkyl group with 10 to 20 carbon atoms is contained by 2.0 to 25.0% by mass in the active energy ray-curable inkjet printing ink composition;

(D) at least one type selected from the group that consists of 1,6-hexanediol diacrylate, 3-methyl-1,5-pentanediol diacrylate, dipropylene glycol diacrylate, propoxylated (2) neopentyl glycol diacrylate, and hydroxypivalic acid neopentyl glycol diacrylate is contained by 5.0 to 25.0% by mass in the active energy ray-curable inkjet printing ink composition;

(E) a plant oil-derived 1,10-decanediol diacrylate is contained by 10.0 to 40.0% by mass in the active energy ray-curable inkjet printing ink composition.

2. The active energy ray-curable inkjet printing ink composition according to 1, wherein 50 to 100% by mass of the alkoxy group-containing (meth)acrylate monomers in (B) are polyfunctional alkoxy (meth)acrylate monomers.

3. The active energy ray-curable inkjet printing ink composition according to 1 or 2, containing a (F) photopolymerization initiator.

4. The active energy ray-curable inkjet printing ink composition according to any one of 1 to 3, wherein the (F) photopolymerization initiator comprises one or more types selected from 2,4,6-trimethylbenzyl-diphenylphosphine oxide, ethoxy(2,4,6-trimethylbenzoyl)phenylphosphine oxide, bis(2,4,6-trimethylbenzoyl)phenylphosphine oxide, oligo{2-hydroxy-2-methyl-1-[4-(1-methylvinyl)phenyl]propanone}, polymer-type initiators, and bis[4-(2-hydroxy-2-methylpropanoyl)phenyl]ether.

5. The active energy ray-curable inkjet printing ink composition according to any one of 1 to 4, wherein (G) hydroxyl group-containing (meth)acrylate monomers are contained by 3.0 to 20.0% by mass in the active energy ray-curable inkjet printing ink composition.

6. The active energy ray-curable inkjet printing ink composition according to any one of 1 to 5, wherein the (C) (meth)acrylate monomer having an alkyl group with 10 to 20 carbon atoms is a plant oil-derived lauryl acrylate.

7. The active energy ray-curable inkjet printing ink composition according to any one of 1 to 6, containing a (H) colorant.

Effects of the Invention

The active energy ray-curable inkjet printing ink composition proposed by the present invention permits sufficiently adequate printing despite containing plant-derived materials. It can demonstrate the effects of very little odor, low viscosity, excellent active energy ray curability, absence of curing wrinkles in the cured film, as well as excellent curability and bending tolerance property.

MODE FOR CARRYING OUT THE INVENTION

The active energy ray-curable inkjet printing ink composition proposed by the present invention, which satisfies requirements A to E above, is explained below in order.
<Requirement A>

Requirement A states that an acrylated amine compound having two photopolymerizable functional groups and two amino groups in a molecule is contained by 1.0 to 20.0% by mass in the active energy ray-curable inkjet printing ink composition.

Here, the acrylated amine compound having two photopolymerizable functional groups and two amino groups in a molecule is not limited in any specific way. For example, the photopolymerizable functional groups in the acrylated amine compound may be functional groups that can form crosslinked bonds between molecules by undergoing polymerization reaction under visible light or invisible light such as ultraviolet ray, electron beam, or other ionizing radiation. Also, the photopolymerizable functional groups include both narrowly-defined photopolymerizable functional groups that are directly activated by irradiation of light to undergo photopolymerization reaction, and broadly-defined photopolymerizable functional groups whose polymerization reaction is initiated and promoted by the action of active species generated by photopolymerization initiators when light is irradiated on the photopolymerizable functional groups in the presence of the photopolymerization initiators.

The photopolymerizable functional groups are ethylenic double bonds, etc., having photoradical polymerization reactivity, or epoxy groups or other cyclic ether groups, etc., having cationic photopolymerization or anionic photopolymerization reactivity. Among these, the photopolymerizable functional groups are preferably ethylenic double bonds of (meth)acryloyl groups, vinyl groups, allyl groups, etc., or more preferably (meth)acryloyl groups.

Preferably the acrylated amine compound having two photopolymerizable functional groups and two amino groups in a molecule is such that the two photopolymerizable functional groups are both (meth)acryloyl groups and that its amine value is 130 to 142 KOHmg/g. It should be noted that this amine value represents the amine value per 1 gram of solids content, measured with a 0.1-N aqueous solution of hydrochloric acid according to the potentiometric titration method (using, for example, COMTITE (AUTO TITRATOR COM-900, BURET B-900, TITSTATION K-900), manufactured by Hiranuma Sangyo Co., Ltd.) and then converted to an equivalent amount of potassium hydroxide.

Preferably the acrylated amine compound having two photopolymerizable functional groups and two amino groups in a molecule is an acrylated amine compound obtained by reacting a bifunctional (meth)acrylate with an amine compound.

The bifunctional (meth)acrylate is 1,4-butanediol di(meth)acrylate, 1,6-hexanediol di(meth)acrylate, 1,9-nonanediol di(meth)acrylate, propylene glycol di(meth)acrylate, 1,3-butylene glycol di(meth)acrylate, neopentyl glycol di(meth) acrylate, or other alkylene glycol di(meth)acrylate, di(meth) acrylate of ethylene oxide adduct of bisphenol A, di(meth) acrylate of ethylene oxide adduct of bisphenol F, di(meth) acrylate of ethylene oxide adduct of bisphenol S, di(meth) acrylate of ethylene oxide adduct of thiobisphenol, di(meth) acrylate of ethylene oxide adduct of brominated bisphenol A, or other bisphenol alkylene oxide adduct di(meth)acrylate, polyethylene glycol di(meth)acrylate, polypropylene glycol di(meth)acrylate, or other polyalkylene glycol di(meth)acrylate, or di(meth)acrylate of hydroxypivalic acid neopentyl glycol ester, for example. Of these, preferably the bifunctional (meth)acrylate is 1,6-hexanediol di(meth)acrylate.

The amine compound is benzylamine, phenethylamine, ethylamine, n-propylamine, isopropylamine, n-butylamine, isobutylamine, n-pentylamine, isopentylamine, n-hexylamine, cyclohexylamine, n-heptylamine, n-octylamine, 2-ethylhexylamine, n-nonylamine, n-decylamine, n-dodecylamine, n-tetradecylamine, n-hexadecylamine, n-octadecylamine, or other monofunctional amine compound, diethylenetriamine, triethylenetetramine, tetraethylenepentamine, 1,6-hexamethylenediamine, 1,8-octamethylenediamine, 1,12-dodecamethylenediamine, o-phenylenediamine, p-phenylenediamine, m-phenylenediamine, o-xylylenediamine, p-xylylenediamine, m-xylylenediamine, menthanediamine, bis(4-amino-3-methylcyclohexyl) methane, isophoronediamine, 1,3-diaminocyclohexane, spiro-acetal-based diamine, or other polyfunctional amine compound, for example. Also, the amine compound may be polyethyleneimine, polyvinylamine, polyallylamine, or other polyfunctional amine compound of high-molecular-weight type.

Preferably the acrylated amine compound having two photopolymerizable functional groups and two amino groups in a molecule is a compound obtained by reacting 1,6-hexanediol di(meth)acrylate with an amine compound. Specific examples include such acrylated amine compounds as CN371, CN373, CN383, and CN386 (manufactured by Sartomer Inc.) that are oligomers of acrylated amine compounds having two active energy ray-polymerizable functional groups and two amino groups in a molecule. Furthermore, EB7100 (EBECRYL 7100, manufactured by Cytec Industries, Inc.), AgiSyn 008 (manufactured by DSM company), etc., may also be used.

The content of acrylated amine compound having two photopolymerizable functional groups and two amino groups in a molecule, in the active energy ray-curable inkjet printing ink composition, is 1.0% by mass or higher, or preferably 4.0% by mass or higher, or more preferably 5.0% by mass or higher.

Also, the content of acrylated amine compound having two photopolymerizable functional groups and two amino groups in a molecule, in the active energy ray-curable inkjet printing ink composition, is 20.0% by mass or lower, or preferably 12.0% by mass or lower, or more preferably 9.0% by mass or lower.

If the content of acrylated amine compound having two photopolymerizable functional groups and two amino groups in a molecule is under 1.0% by mass, the active energy ray-curable inkjet printing ink composition tends to have poor curability. If the content exceeds 20.0% by mass, on the other hand, the ink composition tends to have lower storage stability and discharge stability.

Also, the content of acrylated amine compound having two photopolymerizable functional groups and two amino groups in a molecule, relative to all photopolymerizable components in the active energy ray-curable inkjet printing ink composition, is preferably 1.2% by mass or higher, or more preferably 4.0% by mass or higher.

Also, the content of acrylated amine compound having two photopolymerizable functional groups and two amino groups in a molecule, relative to all photopolymerizable components in the active energy ray-curable inkjet printing ink composition, is preferably 17.0% by mass or lower, or more preferably 14.0% by mass or lower.

<Requirement B>

Requirement B states that alkoxy group-containing (meth)acrylate monomers are contained by 2.0 to 20.0% by mass among all polymerizable components in the active energy ray-curable inkjet printing ink composition.

The alkoxy group-containing (meth)acrylate monomers are not limited in any specific way. For example, these (meth)acrylate monomers may be various monofunctional (meth)acrylate monomers, bifunctional (meth)acrylate monomers, trifunctional (meth)acrylate monomers, or tetra-functional or higher-functional (meth)acrylate monomers, and the like, all generating very little odor. In consideration of the environment, (meth)acrylate monomers containing biomass-derived alkoxy groups may be used.

Specific examples include 2-methoxyethyl (meth)acrylate, 2-ethoxyethyl (meth)acrylate, 2-methoxybutyl (meth)acrylate, 2-(2-ethoxyethoxy)ethyl acrylate, 3-methoxybutyl (meth)acrylate, 2-butoxyethyl (meth)acrylate, and other monofunctional alkoxyalkyl (meth)acrylates, 2-butoxydi-ethylene glycol (meth)acrylate, methoxydiethylene glycol (meth)acrylate, methoxytriethylene glycol (meth)acrylate, ethoxydiethylene glycol (meth)acrylate, methoxydipropyl-ene glycol (meth)acrylate, methoxytripropylene glycol (meth)acrylate, methoxypolyethylene glycol (meth)acrylate, octoxypolyethylene glycol-polypropylene glycol mono (meth)acrylate, lauroxypolyethylene glycol mono(meth) acrylate, stearoxypolyethylene glycol mono(meth)acrylate, and other polyalkylene glycol structure-containing mono-functional alkoxy group-containing (meth)acrylates, and additionally, ethoxylated (3) trimethylolpropane tri(meth) acrylate, propoxylated (2) neopentyl glycol di(meth)acry-late, and other polyfunctional alkoxy group-containing (meth)acrylates may also be adopted.

The content of alkoxy group-containing (meth)acrylate monomers in the active energy ray-curable inkjet printing ink composition is preferably 2.0% by mass or higher.

Also, the content of alkoxy group-containing (meth) acrylate monomers in the active energy ray-curable inkjet printing ink composition is 20.0% by mass or lower, or preferably 13.0% by mass or lower.

If the content of alkoxy group-containing (meth)acrylate monomers in the active energy ray-curable inkjet printing ink composition is under 2.0% by mass, bending tolerance property will become poor, while a content exceeding 20.0% by mass may lead to poor water resistance.

In addition, preferably 50 to 100% by mass of the alkoxy group-containing (meth)acrylate monomers in requirement B are alkoxy group-containing polyfunctional (meth)acry-lates. When the alkoxy group-containing polyfunctional (meth)acrylates are in this range, a film offering excellent rub resistance can be obtained.

<Requirement C>

Requirement C states that a (meth)acrylate monomer containing an alkyl group with 10 to 20 carbon atoms is contained by 2.0 to 25.0% by mass in the active energy ray-curable inkjet printing ink composition. An alkyl group with 10 to 20 carbon atoms can have any of straight-chain, branched and alicyclic structures.

Here, the (meth)acrylate monomer containing an alkyl group with 10 to 20 carbon atoms is a monofunctional (meth)acrylate.

Examples of such monofunctional (meth)acrylate include tridecyl (meth)acrylate, lauryl (meth)acrylate, stearyl (meth) acrylate, isoamyl (meth)acrylate, isodecyl (meth)acrylate, isotetradecyl (meth)acrylate, isobornyl (meth)acrylate, cyclohexyl (meth)acrylate, etc.

The content of (meth)acrylate monomer containing an alkyl group with 10 to 20 carbon atoms in the active energy ray-curable inkjet printing ink composition is 2.0% by mass or higher, or preferably 3.0% by mass or higher, or more preferably 5.0% by mass or higher.

Also, the content of (meth)acrylate monomer containing an alkyl group with 10 to 20 carbon atoms in the active energy ray-curable inkjet printing ink composition is 25.0% by mass or lower, or preferably 23.0% by mass or lower, or more preferably 21.0% by mass or lower.

If the content of (meth)acrylate monomer containing an alkyl group with 10 to 20 carbon atoms is under 2.0% by mass in the active energy ray-curable inkjet printing ink composition, bending tolerance property will become poor, while a content exceeding 25.0% by mass will lead to poor rub resistance.

One of the materials constituting this (meth)acrylate monomer containing an alkyl group with 10 to 20 carbon atoms is a (meth)acrylic acid, and the other material is an alcohol with 10 to 20 carbon atoms. In addition, this alcohol can be obtained from a plant-derived material, for example, and has a recyclable carbon. This plant-derived material may be palm oil, palm kernel oil, coconut oil, or other plant material.

An alkyl group with 10 to 20 carbon atoms has a relatively large number of carbon atoms, the effect of which is that the more a (meth)acrylate monomer containing such an alkyl group is used as a material in the active energy ray-curable inkjet printing ink composition, the more biomass-derived carbon in the composition as a whole can be used.

<Requirement D>

Requirement D states that at least one type selected from 1,6-hexanediol diacrylate, 3-methyl-1,5-pentanediol diacry-late, dipropylene glycol diacrylate, propoxylated (2) neo-pentyl glycol diacrylate, and hydroxypivalic acid neopentyl glycol diacrylate is contained by 5.0 to 25.0% by mass in the active energy ray-curable inkjet printing ink composition.

The total content of these di(meth)acrylates in the active energy ray-curable inkjet printing ink composition is 5.0% by mass or higher, or preferably 7.0% by mass or higher, or more preferably 9.0% by mass or higher.

Also, the total content of these di(meth)acrylates in the active energy ray-curable inkjet printing ink composition is 25.0% by mass or lower, or preferably 23.0% by mass or lower, or more preferably 21.0% by mass or lower.

<Requirement E>

Requirement E states that a plant oil-derived 1,10-decane-diol diacrylate is contained by 10.0 to 40.0% by mass in the active energy ray-curable inkjet printing ink composition.

"Plant oil-derived" means the 1,10-decanediol, which is one of the materials, is derived from plant oil.

The total content of the 1,10-decanediol diacrylate in the active energy ray-curable inkjet printing ink composition is 10.0% by mass or higher, or preferably 13.0% by mass or higher, or more preferably 17.0% by mass or higher.

Also, the total content of these di(meth)acrylates in the active energy ray-curable inkjet printing ink composition is 40.0% by mass or lower, or preferably 35.0% by mass or lower, or more preferably 33.0% by mass or lower.

It should be noted that the compounds in requirements D and E are contained in such a way that their total amount falls within a range of 30.0 to 60.0% by mass in the active energy ray-curable inkjet printing ink composition. If the total amount of the compounds in requirements D and E are under 30.0% by mass, rub resistance will become poor, while a total amount exceeding 60.0% by mass will lead to poor bending tolerance property.

<Requirement G>

Requirement G states that hydroxyl group-containing (meth)acrylate monomers may be contained by 3.0 to 20.0% by mass in the active energy ray-curable inkjet printing ink composition. It should be noted, however, that hydroxyl group-containing (meth)acrylate monomers may or may not be contained in the active energy ray-curable inkjet printing ink composition.

For the hydroxyl group-containing (meth)acrylate monomers, one or more types selected from the monomers below may be used:

2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, 6-hydroxyhexyl (meth)acrylate, 8-hydroxyoctyl (meth)acrylate, and other hydroxyalkyl (meth) acrylates, diethylene glycol monoethyl ether (meth)acrylate and other polyethylene glycol mono(meth)acrylates, polypropylene glycol mono(meth)acrylate, 1,4-cyclohexanedimethanol mono(meth)acrylate, and other glycol mono (meth)acrylates, caprolactone-modified (meth)acrylate, hydroxyethyl acrylamide, EO (ethylene oxide)-modified succinic acid (meth)acrylate, etc., where hydroxyl group-containing (meth)acrylate monomers generating very little odor, such as 4-hydroxybutyl (meth)acrylate, are preferred.

Under the present invention, the content of hydroxyl group-containing (meth)acrylate monomers among all photopolymerizable components in the active energy ray-curable inkjet printing ink composition is preferably 7.0% by mass or higher, and preferably 15.0% by mass or lower.

<Requirement I>

As requirement I, a vinyl monomer may be contained. A vinyl monomer may be contained by 1.0 to 20.0% by mass among all polymerizable components in the active energy ray-curable inkjet printing ink composition. By containing a vinyl monomer, it will, when printed on a cardboard sheet, etc., and the cardboard sheet, etc., is bent, demonstrate better bending tolerance property.

It should be noted, however, that a vinyl monomer may or may not be contained in the active energy ray-curable inkjet printing ink composition.

The vinyl monomer is not limited in any specific way. For example, the vinyl monomer may be ethylene glycol divinyl ether, triethylene glycol divinyl ether, diethylene glycol divinyl ether, 1,4-cyclohexane dimethanol divinyl ether, ethylene glycol monovinyl ether, propylene glycol divinyl ether, dipropylene glycol divinyl ether, butanediol divinyl ether, hexanediol divinyl ether, trimethylolpropane trivinyl ether, etc.

Of these, preferably the vinyl monomer is triethylene glycol divinyl ether, etc., generating very little odor.

<Other Compounds>

Under the present invention, polymerizable compounds other than the polymerizable components subject to requirements A to E, G, and I may be contained to the extent that the performance will not drop, and odor will be minimal.

It should be noted that, in the compounds listed below, "(poly)" before polyol terms indicates a condensation product of a mono-, or di- or higher polyols.

(Alkylene Glycol Di(meth)acrylates)

Ethylene glycol di(meth)acrylate, diethylene glycol di(meth)acrylate, propylene glycol di(meth)acrylate, dipropylene glycol di(meth)acrylate, triethylene glycol di(meth) acrylate, tripropylene glycol di(meth)acrylate, and other (poly)alkylene glycol di(meth)acrylates, 1,4-butanediol di(meth)acrylate, 1,5-propanediol di(meth)acrylate, 1,6-hexanediol di(meth)acrylate, 1,2-hexanediol di(meth)acrylate, 1,5-hexanediol di(meth)acrylate, 2,5-hexanediol di(meth)acrylate, 1,7-heptanediol di(meth)acrylate, 1,8-octanediol di(meth)acrylate, 1,2-octanediol di(meth)acrylate, 1,9-nonanediol di(meth)acrylate, 1,2-decanediol di(meth)acrylate, 2-methyl-2-propyl-1,3-propanediol di(meth)acrylate, 2,4-dimethyl-2,4-pentanediol di(meth)acrylate, 2,2-diethyl-1,3-propanediol di(meth)acrylate, 2,2,4-trimethyl-1,3-pentanediol di(meth)acrylate, 1,12-dodecanediol di(meth)acrylate, 1,2-dodecanediol di(meth)acrylate, 1,14-tetradecanediol di(meth)acrylate, 1,2-tetradecanediol di(meth)acrylate, 1,16-hexadecanediol di(meth)acrylate, 1,2-hexadecanediol di(meth)acrylate, 2-methyl-2,4-pentanediol di(meth)acrylate, 3-methyl-1,5-pentanediol di(meth)acrylate, dimethyloloctane di(meth)acrylate, 2-ethyl-1,3-hexanediol di(meth)acrylate, 2,5-dimethyl-2,5-hexanediol di(meth)acrylate, 2-methyl-1,8-octanediol di(meth)acrylate, 2-butyl-2-ethyl-1,3-propanediol di(meth)acrylate, 2,4-diethyl-1,5-pentanediol di(meth)acrylate, polyethylene glycol di(meth)acrylate, and polypropylene glycol di(meth)acrylate;

((Poly)glycerin Poly(meth)acrylates)

Glycerin di(meth)acrylate, glycerin tetra(meth)acrylate, and diglycerin tetra(meth)acrylate;

((Poly)trimethylolpropane Poly(meth)acrylates)

Trimethylolpropane (meth)acrylate, trimethylolpropane di(meth)acrylate, trimethylolpropane tri(meth)acrylate, trimethylolpropane tetra(meth)acrylate, ditrimethylolpropane (meth)acrylate, ditrimethylolpropane di(meth)acrylate, ditrimethylolpropane tri(meth)acrylate, and ditrimethylolpropane tetra(meth)acrylate;

((Poly)pentaerythritol Poly(meth)acrylates)

Pentaerythritol tetra(meth)acrylate and ethylene oxide-modified products thereof, dipentaerythritol penta(meth) acrylate and ethylene oxide-modified products thereof, dipentaerythritol hexa(meth)acrylate and ethylene oxide-modified products thereof, tripentaerythritol hexa(meth) acrylate, tripentaerythritol hepta(meth)acrylate, and tripentaerythritol octa(meth)acrylate.

(Other Multivalent Acrylates)

As multivalent acrylates not encompassed in the foregoing, the following may be used:

Pentaerythritol tetracaprolactonate tetra(meth)acrylate, ditrimethylolpropane tetracaprolactonate tetra(meth)acrylate, ditrimethylolbutane tetra(meth)acrylate, ditrimethylolhexane tetra(meth)acrylate, ditrimethyloloctane tetra(meth) acrylate, tripentaerythritol polyalkylene oxide hepta(meth) acrylate, and other tetrafunctional or higher-functional monomers, etc., as well as hydroxypivalyl hydroxypivalate di(meth)acrylate, hydroxypivalyl hydroxypivalate dicaprolactonate di(meth)acrylate, etc.

It should be noted that 2-(2-vinyloxyethoxy)ethyl acrylate and 2-(allyloxymethyl)methyl acrylate may or may not be contained.

<Other Photopolymerizable Components>

The photopolymerizable components that may be blended in the active energy ray-curable inkjet printing ink composition proposed by the present invention include the following:

Benzyl (meth)acrylate, butyl (meth)acrylate, ethyl carbitol (meth)acrylate, caprolactone (meth)acrylate, methoxy tripropylene glycol (meth)acrylate, phenoxyethyl (meth) acrylate, as well as others including acryloylmorpholine, acrylonitrile, acrylamide, diethylacrylamide, styrene, (meth) acrylate, urethane (meth)acrylate, epoxy (meth)acrylate, polyester (meth)acrylate, pentaerythritol ethoxy tetraacrylate, caprolactam-modified dipentaerythritol hexaacrylate, ethoxylated bisphenol A diacrylate, alkoxylated tetrahydrofurfuryl acrylate, dimethylol-tricyclodecane di(meth)acrylate, hydroxypivalic acid neopentyl glycol di(meth)acrylate, polytetramethylene glycol diacrylate, trimethylolpropane tri (meth)acrylate and ethylene oxide-modified products thereof, pentaerythritol tri(meth)acrylate, etc.

It should be noted that amide group-containing monomers may or may not be contained.

<Requirement F>

A photopolymerization initiator(s) may be contained in the active energy ray-curable inkjet printing ink composition proposed by the present invention. It should be noted that, if electron beam is used as the active energy ray, photopolymerization initiators may or may not be contained.

The photopolymerization initiators that may be used include the following:

Acylphosphine oxide-based polymerization initiators such as bis-2,6-dimethoxybenzoyl-2,4,4-trimethylpentylphosphine oxide, 2,4,6-trimethylbenzyl-diphenylphosphine oxide (TPO), bis(2,4,6-trimethylbenzoyl)phenylphosphine oxide (Irgacure 819 or SB—PI719), ethoxy(2,4,6-trimethylbenzoyl)phenylphosphine oxide (TPOL), etc., as well as α-hydroxyketone-based polymerization initiators such as 2-hydroxy-1-{4-[4-(2-hydroxy-2-methyl-propionyl)-benzyl]-phenyl}-2-methyl-propane-1-one (Irgacure 127), 2-hydroxy-4'-hydroxyethoxy-2-methylpropiophenone (Irgacure 2959), 1-hydroxycyclohexyl phenyl ketone (Irgacure 184), oligo{2-hydroxy-2-methyl-1-[4-(1-methylvinyl) phenyl]propanone} (ESACURE ONE), 2-hydroxy-2-methyl-1-phenylpropane-1-one, 1-[4-(2-hydroxyethoxy)-phenyl]-2-hydroxy-2-methyl-1-propane-1-one, bis[4-(2-hydroxy-2-methylpropanoyl)phenyl] ether (KIP160), etc.

Others include benzophenone-based compounds (4,4'-diethylaminobenzophenone, etc.), 2-methyl-1-(4-methylthio)phenyl-2-morpholinopropane-1-one, 4'-(methylthio)-α-morpholino-α-methylpropiophenone, thiophenyl-based compounds (4-benzoyl-4'-methyldiphenyl sulfide), thioxanthone-based compounds (2,4-diethylthioxanthone, 1-chloro-4-propoxythioxanthone, isopropyl thioxanthone), 2,2-dimethyl-2-hydroxyacetophenone, 2,2-dimethoxy-2-phenylacetophenone, 2-benzyl-2-dimethylamino-1-(morpholinophenyl)-butane-1-one, ethyl Michler's ketone, polymer-type initiators (Omnipol TP, Omnipol BP), and 1-[4-(4-benzoylphenylsulfanyl)phenyl]-2-methyl-2-(4-methylphenylsulfonyl) propane-1-one (ESACURE 1001M).

These photopolymerization initiators are commercially available and can be obtained under the product names of Irgacure 907, Irgacure 369, Irgacure 184, Irgacure 379, Irgacure 819, TPO, etc., for example. Multiple photopolymerization initiators may be used together.

Among them, using an acylphosphine oxide-based polymerization initiator together with an α-hydroxyketone-based polymerization initiator is preferred, and also preferred is to use 2,4,6-trimethylbenzyl-diphenylphosphine oxide, bis(2,4,6-trimethylbenzoyl)phenylphosphine oxide, and oligo{2-hydroxy-2-methyl-1-[4-(1-methylvinyl)phenyl]propanone} together.

It should be noted that thioxanthone-based photopolymerization initiators need not be contained.

The content of photopolymerization initiators is not limited in any specific way. If ultraviolet ray (UV lamp) or ultraviolet ray (light-emitting diode (LED)) is used as the light source, for example, the content of photopolymerization initiators is preferably 3.0% by mass or higher, or more preferably 4.0% by mass or higher, in the active energy ray-curable inkjet printing ink composition. Also, the content of photopolymerization initiators is preferably 25.0% by mass or lower, or more preferably 15.0% by mass or lower, in the active energy ray-curable inkjet printing ink composition. By keeping the content of photopolymerization initiators within the aforementioned range, the active energy ray-curable inkjet printing ink composition can have sufficient curability and internal curability while being low in cost.

(Sensitizer)

In the active energy ray-curable inkjet printing ink composition proposed by the present invention, a photosensitizer (compound) that has light absorbing properties primarily in the ultraviolet ray wavelength range of 400 nm and higher and manifests a function to sensitize the curing reaction under light having the wavelengths in this range, may also be used together with the photopolymerization initiators, to promote curability under ultraviolet ray from a light-emitting diode (LED) light source. It should be noted that " . . . 400 nm and higher and manifests a function to sensitize . . . under light having the wavelengths in this range . . . " above means having light absorbing properties in the wavelength range of 400 nm or higher. Use of such sensitizer can promote the LED curability of the ink composition in this embodiment.

Such sensitizer may be an anthracene-based sensitizer, thioxanthone-based sensitizer, etc., where a thioxanthone-based sensitizer is preferred. Any of these sensitizers may be used alone or two or more types may be used together.

Specific examples include 9,10-dibutoxyanthracene, 9,10-diethoxyanthracene, 9,10-dipropoxyanthracene, 9,10-bis(2-ethylhexyloxy) anthracene, and other anthracene-based sensitizers, as well as 2,4-diethyl thioxanthone, 2-isopropyl thioxanthone, 4-isopropyl thioxanthone, and other thioxanthone-based sensitizers. Representative examples of commercial products include DBA and DEA (manufactured by Kawasaki Kasei Chemicals Ltd.) for anthracene-based sensitizers, and DETX, ITX, CPTX (manufactured by Lambson Ltd.), and Omnipol TX (manufactured by IGM Resins Ltd.) for thioxanthone-based sensitizers, and the like.

Preferably the sensitizer content is in a range of 0 to 8.0% by mass relative to the total mass of active energy ray-polymerizable components. A content exceeding 8.0% by mass is not desirable because it represents an excessive addition that no longer leads to improvement in effects.

It should be noted that, if a thioxanthone-based sensitizer is used as the sensitizer, the active energy ray-curable inkjet printing ink composition tends to turn yellow and take on a hue that is yellower than the color based on the pigment, etc. (inherent hue), and therefore preferably the content of such thioxanthone-based sensitizer is determined as deemed appropriate for each color.

To be specific, preferably white ink compositions and clear ink compositions that are more easily affected by a change in color tone do not contain any thioxanthone-based compound as the sensitizer. Also, preferably magenta ink compositions and cyan ink compositions subject to problems of changing hue use a thioxanthone-based compound only to the extent that doing so does not cause problems with the hue. Also, preferably black ink compositions and yellow ink compositions use a thioxanthone-based compound as an additional sensitizer because their hue is not affected by a color change and their active energy-ray polymerizability is lower compared to ink compositions of other hues.

To the extent that the performance of the active energy ray-curable inkjet printing ink composition proposed by the present invention does not drop, resins other than the aforementioned acrylic-based resins, such as vinyl chloride-based resin, vinyl chloride-vinyl acetate-based resin, ethylene-vinyl acetate-based resin, styrene-acrylic-based resin, styrene-maleic acid-based resin, rosin-based resin, rosin ester-based resin, petroleum resin, coumarone indene-based resin, terpene phenol-based resin, phenol resin, ketone resin, urethane resin, melamine resin, urea resin, epoxy-based resin, cellulose-based resin, xylene resin, alkyd resin, aliphatic hydrocarbon resin, butyral resin, maleic acid resin, fumaric acid resin, etc., may also be used together.

<Requirement H>

For the colorant contained in the active energy ray-curable inkjet printing ink composition proposed by the present invention, any known pigment or dye traditionally used in active energy ray-curable inkjet printing ink compositions may be used, where it is preferably an organic coloring pigment, inorganic coloring pigment, or other coloring pigment. As a result, active energy ray-curable inkjet printing ink compositions of various colors can be obtained.

Organic coloring pigments include dye lake pigments as well as azo-based, benzimidazolone-based, phthalocyanine-based, quinacridone-based, anthraquinone-based, dioxazine-based, indigo-based, thioindigo-based, perylene-based, perinone-based, diketopyrolopyrrole-based, isoindolinone-based, nitro-based, nitroso-based, flavanthrone-based, quinophthalone-based, pyranthrone-based, indanthrone-based pigments, and the like.

Inorganic coloring pigments include titanium oxide, red iron oxide, antimony red, cadmium yellow, cobalt blue, ultramarine blue, Prussian blue, iron black, chrome oxide green, carbon black, graphite, and other colored pigments (including coloring pigments of white, black, and other achromatic colors) as well as calcium carbonate, kaolin, clay, barium sulfate, aluminum hydroxide, talc, and other extender pigments, for example.

Specific examples of the aforementioned coloring pigments are listed below by representative hue.

Yellow pigments include C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, 213, etc., of which C. I. Pigment Yellow 150, 155, 180, 213, etc., are preferred.

Magenta pigments include C. I. Pigment Red 5, 7, 12, 19, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, 270, C. I. Pigment Violet 19, etc., of which C. I. Pigment Red 122, 202, C. I. Pigment Violet 19, etc., are preferred.

Cyan pigments include C. I. Pigment Blue 1, 2, 3, 15, 15:1, 15:2, 15:3, 15:4, 15:6, 16, 18, 22, 27, 29, 60, etc., of which C. I. Pigment Blue 15:4, etc., are preferred.

Black pigments include carbon black (C. I. Pigment Black 7), etc.

White pigments include titanium oxide, aluminum oxide, etc., of which titanium oxide whose surface is treated with alumina, silica, or any of various other materials is preferred, for example.

The content of colorant is preferably 1% by mass or higher in the ink composition, and preferably 20% by mass or lower in the ink composition. When the content of colorant is within the aforementioned range, the ink composition will ensure proper image quality of printed matters obtained therewith and also demonstrate excellent viscometric property.

(Pigment Dispersant)

The pigment dispersants that may be contained in the active energy ray-curable inkjet printing ink composition proposed by the present invention, when it contains a pigment, include ionic or nonionic surfactants, and anionic, cationic, or nonionic high-molecular compounds, for example.

In particular, those constituted by high-molecular compounds are preferred and, for example, the carbodiimide-based compounds described in Japanese Patent Laid-open No. 2004-083872, International Patent Laid-open No. WO2003/076527, and International Patent Laid-open No. WO2004/000950, AJISPER PB821 and 822 (manufactured by Ajinomoto Fine-Techno Co., Inc.) that are basic functional group-containing copolymers, SOLSPERSE 56000 (manufactured by The Lubrizol Corporation), SOLSPERSE 32000 (manufactured by The Lubrizol Corporation), SOLSPERSE 39000 (manufactured by The Lubrizol Corporation), DISPERBYK (manufactured by BYK-Chemie Japan K.K.), etc., are preferred. Any one type of these pigment dispersants may be used alone, or two or more types may be combined.

In particular, basic functional group-containing copolymers with an amine value of 10 to 40 mgKOH/g are preferred.

It should be noted that any of the aforementioned pigment dispersants may be selected and used as deemed appropriate according to the type of pigment and type of organic solvent used.

(Organic Solvent)

The active energy ray-curable inkjet printing ink composition proposed by the present invention may be of a so-called nonsolvent type in which all liquid components undergo curing reaction to be solidified, or of a solvent type in which the printed coating film is dried to remove solvent and then cured. It should be noted that water is not used as a solvent.

The following describes a case where the active energy ray-curable inkjet printing ink composition proposed by the present invention contains an organic solvent.

The organic solvents that may be contained in the active energy ray-curable inkjet printing ink composition proposed by the present invention include propylene carbonate, diethylene glycol dialkyl ether, dipropylene glycol alkyl ether acetate, etc.

For the diethylene glycol dialkyl ether, preferably diethylene glycol ethyl methyl ether and/or diethylene glycol diethyl ether is/are used, or any other diethylene glycol dialkyl ether may also be combined.

For the dipropylene glycol alkyl ether acetate, preferably one containing an alkyl group with 6 or fewer carbon atoms, or more preferably one containing an alkyl group with 3 or fewer carbon atoms, or yet more preferably one containing an alkyl group with 2 or fewer carbon atoms, may be adopted.

Additionally, besides diethylene glycol dialkyl ether, an alkylene glycol derivative with a flash point of 50 to 150° C. may also be combined in order to adjust drying property and further improve anti-mottling property.

Examples of such alkylene glycol derivatives with a flash point of 50 to 150° C. include, for example, triethylene glycol dimethyl ether, triethylene glycol diethyl ether, tetraethylene glycol dimethyl ether, and other (poly)ethylene glycol dialkyl ethers, propylene glycol dimethyl ether, propylene glycol diethyl ether, dipropylene glycol dimethyl ether, dipropylene glycol diethyl ether, tetrapropylene glycol diethyl ether, tetrapropylene glycol dimethyl ether, and other (poly)propylene glycol dialkyl ethers, propylene glycol monobutyl ether, dipropylene glycol monomethyl ether, dipropylene glycol monoethyl ether, and other (poly)propylene glycol monoalkyl ethers, propylene glycol monoethyl ether acetate, propylene glycol monobutyl ether acetate, dipropylene glycol monomethyl ether acetate, dipropylene glycol monoethyl ether acetate, dipropylene glycol monobutyl ether acetate, and other (poly)propylene glycol monoalkyl ether monoalkyl esters, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monobutyl ether, and other (poly)ethylene glycol monoalkyl ethers, ethylene glycol monomethyl ether acetate, ethylene glycol monoethyl ether acetate, ethylene glycol monobutyl ether acetate, diethylene glycol monomethyl ether acetate, triethylene glycol monomethyl ether acetate, and other (poly)ethylene glycol monoalkyl ether monoalkyl esters, ethylene glycol diacetate, diethylene glycol diacetate, triethylene glycol diacetate, and other (poly)ethylene glycol diesters, ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, diethylene glycol monopropyl ether acetate, triethylene glycol monomethyl ether acetate, triethylene glycol monoethyl ether acetate, triethylene glycol monobutyl ether acetate, and other (poly)ethylene glycol monoether monoesters.

Among the alkylene glycol derivatives with a flash point of 50 to 150° C., diethylene glycol ethyl methyl ether and diethylene glycol diethyl ether are called to attention first.

Also, to the extent that it does not significantly change the flash point of the solvent as a whole, ethylene glycol diethyl ether, ethylene glycol dimethyl ether, propylene glycol monomethyl ether, propylene glycol monoethyl ether, propylene glycol monomethyl ether acetate, etc., whose flash point is not in a range of 50 to 150° C. may also be combined.

(Other Components)

Furthermore, in the active energy ray-curable inkjet printing ink composition proposed by the present invention, various additives such as surfactants, plasticizers, polymerization inhibitors, surface conditioners, ultraviolet protective agents, photostabilizers, and antioxidants may be used as necessary.

(Viscosity of Active Energy Ray-curable Inkjet Printing Ink Composition)

Preferably the active energy ray-curable inkjet printing ink composition proposed by the present invention has a viscosity of 30.0 mPas or lower at 25° C. If the viscosity exceeds 30.0 mPas, discharging of the ink composition from inkjet printing nozzles may become difficult.

It should be noted that this viscosity represents viscosity measured under the conditions of 25° C. and 20 rpm using a type-E viscometer (product name: RE100L Viscometer, manufactured by Toki Sangyo Co., Ltd.).

(Manufacturing of Active Energy Ray-curable Inkjet Printing Ink Composition)

Next, how the active energy ray-curable inkjet printing ink composition proposed by the present invention is manufactured using these materials is explained.

The active energy ray-curable inkjet printing ink composition proposed by the present invention can be obtained by dispersing and mixing the materials using a wet circulation mill, bead mill, ball mill, sand mill, attritor, roll mill, DCP mill, agitator, Henschel mixer, colloid mill, ultrasonic homogenizer, high-pressure homogenizer (Microfluidizer, Nanomizer, Ultimizer, Genus Py, DeBEE 2000, etc.), pearl mill, or other dispersion machine, for example, and adjusting the viscosity of the active energy ray-curable inkjet printing ink composition to between 2 and 10 mPas.

Preferably the content of all organic solvents in the active energy ray-curable inkjet printing ink composition proposed by the present invention, which is the total amount of ink composition less the total sum of the amounts of solids content as well as other additives used as necessary, is changed as deemed appropriate so as to bring the ink viscosity into the aforementioned range.

The thus obtained active energy ray-curable inkjet printing ink composition proposed by the present invention can be used with inkjet printers on base materials whose top face layer at least is constituted by a paper or resin such as vinyl chloride-based polymer and ethylene-vinyl acetate-based copolymer.

(Method for Manufacturing Printed Matter)

Next, how a printed matter is manufactured using the active energy ray-curable inkjet printing ink composition proposed by the present invention is explained.

This manufacturing method includes a step to print the aforementioned active energy ray-curable inkjet printing ink composition on a base material according to the inkjet method.

The base material is not limited in any specific way. For example, the base material may be one constituted by various resins, or by paper, capsule, gel, metal foil, glass, wood, fabric, etc., but particularly a cardboard sheet. The ink composition in this embodiment demonstrates excellent bending tolerance property even when the base material on which it has been printed is bent. This makes it particularly favorable to use the ink composition when the base material is a cardboard sheet or other base material used in bending applications.

If the base material is a cardboard sheet of C-liner or K-liner type or the like, the ink composition may be added directly on the cardboard sheet, or it may be added after providing a precoat layer (primer layer) on the cardboard sheet or giving it corona discharge treatment, etc. This is mentioned because used paper, recycled paper, etc., is utilized for cardboard sheets in recent years in consideration of the environment. When using a K-liner cardboard sheet, the coarse irregularity, dull color, and high permeability of printed inks, of/into its surface require attention. This is why printing the ink composition on such cardboard sheet will likely cause a drop in printing quality due to the brown color of the liner body paper constituting the substrate.

Particularly when the color of the substrate shows through in the printed areas, the inkjet images will appear muddy, and attractiveness of the printed matter will be affected. To rid such cardboard sheet of the aforementioned irregularity, etc., a precoat layer is provided as deemed appropriate.

A precoat layer is provided for the purpose of, for example, adjusting the whiteness, color tone, etc., of the liner body paper constituting the cardboard sheet and thereby increasing the whiteness of the substrate. A precoat layer can be formed by applying a precoat agent containing a pigment and an adhesive.

The pigment is not limited in any specific way. For example, the pigment may be titanium dioxide (anatase, rutile) or aluminum hydroxide, barium sulfate, calcium carbonate, amorphous silica, clay, or other extender pigment. Also, the content of white pigment is preferably 20 to 85 parts by mass, or more preferably 20 to 80 parts by mass, per 100 parts by mass of precoat agent.

Preferably the binder resin used in the precoat layer on the cardboard is an aqueous resin. Preferably the aqueous resin is a natural resin, synthetic resin, etc., where a starch derivative, casein, shellac, polyvinyl alcohol derivative, acrylic-based or maleic acid-based resin, etc., is more preferred. To be more specific, an aqueous acrylic-based resin copolymerized with an acrylic acid or methacrylic acid or alkyl ester thereof, or styrene, etc., as primary monomer components, aqueous styrene-acrylic resin, aqueous styrene-maleic acid resin, aqueous styrene-acrylic acid-maleic acid resin, aqueous polyurethane resin, aqueous polyester resin, etc., may be used favorably as the aqueous resin. The content of binder resin is preferably 1 to 25 parts by mass, or more preferably 1 to 15 parts by mass, relative to 100 parts by mass of precoat agent.

The aqueous media that may be used in the precoat layer (primer layer) include water and mixtures of water with water-miscible solvents. Water-miscible solvents are lower alcohols, polyalcohols, and alkyl ethers or alkyl esters thereof, for example. To be specific, water-miscible solvents include methyl alcohol, ethyl alcohol, normal propyl alcohol, isopropyl alcohol, and other lower alcohols, ethylene glycol, propylene glycol, diethylene glycol, dipropylene glycol, glycerin, and other polyalcohols, ethylene glycol monomethyl ether, ethylene glycol monoethyl ether, ethylene glycol monoacetate, propylene glycol monomethyl ether, propylene glycol monoethyl ether, propylene glycol monoacetate, diethylene glycol monomethyl ether, dipropylene glycol monomethyl ether, etc.

If necessary, film forming agents, pigment dispersants or pigment dispersing resins, anti-blocking agents, humectants, viscosity adjusting agents, pH adjusting agents, defoaming agents, general surfactants, and various other additives may be selected and used in the precoat layer as deemed appropriate besides the components mentioned above.

How the precoat agent is manufactured using these various materials is not limited in any specific way. One example of the method for manufacturing the precoat agent is a general method whereby white pigment, aqueous binder resin, water, water-miscible solvent, if necessary, and pigment dispersant or pigment dispersing resin, are mixed and kneaded together, to which additives, water, water-miscible solvent, if necessary, and the remainder of the specified materials, are added and mixed.

It should be noted that the precoat agent can be obtained more easily by adding together the necessary quantities of the aforementioned components and then mixing and dispersing the components using a homo mixer, lab mixer, or other high-speed mixer, or triple-roll mill, bead mill, or other disperser.

If a primer layer is provided, the thickness of the primer layer (application quantity of the precoat agent) is not limited in any specific way. For the primer layer, preferably the application quantity of solids content is in a range of 0.1 to 5 g/m². Keeping the thickness of the primer layer (application quantity of the precoat agent) within the aforementioned range facilitates the adjustment of the whiteness and color tone of the cardboard sheet to appropriate levels.

The method for printing and curing the active energy ray-curable inkjet printing ink composition proposed by the present invention may specifically be a method whereby the active energy ray-curable inkjet printing ink composition proposed by the present invention is discharged onto a base material from an inkjet head, after which the coating film of the ink composition proposed by the present invention that has landed on the base material is exposed to light and thereby cured.

For example, the discharge onto the base material (printing of images) may be implemented by supplying the active energy ray-curable inkjet printing ink composition proposed by the present invention to the low-viscosity-compatible printer head of an inkjet recording printer, and then discharging the ink composition from the printer head in such a way that the coating film on the base material will have a film thickness of 1 to 60 µm, for example. Also, the exposure to light and curing (curing of images) may be implemented by irradiating an active energy ray onto the coating film of the active energy ray-curable inkjet printing ink composition proposed by the present invention that has been applied on the base material as images.

For the inkjet recording printer device with which to print the active energy ray-curable inkjet printing ink composition proposed by the present invention, any traditionally-used inkjet recording printer device may be utilized. It should be noted that, if a continuous-type inkjet recording printer device is used, a conductivity-adding agent is further added to the active energy ray-curable inkjet printing ink composition proposed by the present invention to adjust its conductivity.

The source of active energy ray in the aforementioned curing of the coating film may be ultraviolet ray (UV lamp), ultraviolet ray (light-emitting diode (LED)), electron beam, visible light, etc. As for the device, specifically one or more types selected from the group that consists of ultrahigh-pressure mercury lamp, high-pressure mercury lamp, low-pressure mercury lamp, mercury xenon lamp, metal halide lamp, high-power metal halide lamp, xenon lamp, pulsed-emission xenon lamp, deuterium lamp, fluorescent light, Nd-YAG third-harmonic laser, He—Cd laser, nitrogen laser, Xe—Cl excimer laser, Xe—F excimer laser, diode-pumped solid-state laser, LED lamp, etc., may be used. Preferably a light-emitting diode (LED) generating an ultraviolet ray of 350 to 420 nm in emission peak wavelength may be used in consideration of the environment.

It should be noted that an ultraviolet ray from a light-emitting diode (LED) light source refers to a "ray irradiated from a light-emitting diode that generates an ultraviolet ray with an emission peak wavelength in a range of 350 to 420 nm."

It should be noted that the temperature of the ink composition at the time of printing may be room temperature of around 20 to 26° C., or it may be other temperatures.

EXAMPLES

The present invention is explained in greater detail below by citing examples, but the present invention is not limited to these examples. It should be noted that, unless otherwise specified, "%" and "part" refer to "% by mass" and "part by mass," respectively.

The materials used in the following Examples and Comparative Examples are listed below. In the Tables, the unit of values in the fields relating to pigments, dispersants, resins, solvents and totals is "% by mass."

(Pigments)
    P. Y. 155: Pigment Yellow 155
    P. V. 19: Pigment Violet 19
    P. B. 15:4: Pigment Blue 15:4
    P. Bl. 7: Pigment Black 7
    P. G. 7: Pigment Green 7
    P. O. 13: Pigment Orange 13
    P. V. 23: Pigment Violet 23
    P. Y. 150: Pigment Yellow 150
(Pigment Dispersant)
    PB822 (AJISPER PB822, manufactured by Ajinomoto Fine-Techno Co., Inc.)
(Amine-modified Oligomer)
    CN371 (manufactured by Sartomer, Inc.)
(Photopolymerization Initiators)
    TPO: 2,4,6-trimethylbenzoyl-diphenylphosphine oxide
    TPO-L: Ethoxy(2,4,6-trimethylbenzoyl)phenylphosphine oxide
    ESACURE ONE: Oligo{2-hydroxy-2-methyl-1-[4-(1-methylvinyl)phenyl]propanone}
    SB—PI719: Bis(2,4,6-trimethylbenzoyl)phenylphosphine oxide
    Omnipol TP (manufactured by IGM Resins Ltd.)
(Sensitizers)
    DETX: Diethylthioxanthone (manufactured by Lambson Ltd.)
    Omnipol TX (manufactured by IGM Resins Ltd.)
(Polymerization Inhibitors)
    MEHQ (Hydroquinone monomethyl ether)
    HQ (Hydroquinone)
(Surface Conditioner)
    BYK-331: Silicone-based surfactant Examples 1 to 11, Comparative Examples 1 to 5

<Manufacturing of Active Energy Ray-curable Inkjet Printing Ink Compositions>

The materials were mixed under agitation according to the formulations in Table 1 (blending ratios of the materials are expressed in % by mass), and then milled, to obtain pigment dispersion liquids of respective colors. And, the active energy ray-curable inkjet printing ink compositions in the Examples and Comparative Examples were obtained according to the compositions in Table 2.

<Cardboard Base Materials>
    K-liner, C-liner

<Precoat Agent>
    45 parts by mass of calcium carbonate with an average particle size of 0.05 µm, 25 parts by mass of styrene-maleic acid resin with an acid value of 170 mgKOH/g (solids content 25%), and 30 parts by mass of water, were dispersed in a bead mill, to obtain a 45% slurry of calcium carbonate. 80 parts by mass of the 45% slurry of calcium carbonate and 20 parts by mass of styrene-maleic acid resin with an acid value of 170 mgKOH/g (solids content 25%) were mixed under agitation to obtain a precoat agent.

<Application of Precoat Agent on K-liner>

The precoat agent prepared above was applied on a K-liner using a 0.1-mm Meyer bar until the application quantity reached approx. 4 g/m2. Next, the precoat agent-applied surface was dried with hot air.

<Evaluation Methods and Evaluation Criteria>

The evaluation criteria for the items shown in Table 2 are as follows.

(Viscosity)

The active energy ray-curable inkjet printing ink compositions obtained in the Examples and Comparative Examples were measured for viscosity using a type-E viscometer (product name: RE100L Viscometer, manufactured by Toki Sangyo Co., Ltd.) under the conditions of 25° C. in temperature and 20 rpm in rotating speed.

(Odor of Coating Film)

A coating film was formed on the base material to a coating film size of 8 cm×12 cm and cured, after which the base material was put in a zipper bag of 24 cm×34 cm and the odor in the bag was checked 1 hour later. 10 subjects were asked to smell the bag and evaluate on the scale of 1 to 5 below. The table shows the average scores of 10 subjects rounded to the nearest integer:
    5: No odor
    4: Low odor
    3: Moderate odor
    2: Strong odor
    1: Intense odor (Storage Stability)

Each active energy ray-curable inkjet printing ink composition was taken into a glass vial which was then sealed and stored for seven days at 70° C., after which the condition of the ink composition was evaluated according to the evaluation criteria below:
    ○: There is no thickening or sedimentation in the active energy ray-curable inkjet printing ink composition.
    Δ: There is thickening or sedimentation in the active energy ray-curable inkjet printing ink composition to the degree returning to the original state after gentle shaking.
    X: There is thickening or sedimentation in the active energy ray-curable inkjet printing ink composition to the degree not returning to the original state after strong shaking.

(Discharge Stability)

An inkjet recording device equipped with an inkjet nozzle, and each active energy ray-curable inkjet printing ink composition, were let stand for 24 hours at an ambient temperature of 25° C., to bring the temperatures of the inkjet recording device and active energy ray-curable inkjet printing ink composition to 25° C. Thereafter, at 25° C., precoated K- and C-liners were continuously printed on (printing characters) using the ink composition to evaluate discharge stability according to the criteria below:
    ○: Printing is not disturbed and discharge is stable.
    Δ: Printing is somewhat disturbed, but discharge is mostly stable.
    X: Printing is disturbed, or discharge is unstable.

(Curability)

An inkjet recording device equipped with an inkjet nozzle, and each active energy ray-curable inkjet printing ink composition, were let stand for 24 hours at an ambient temperature of 25° C., to bring the temperatures of the inkjet recording device and active energy ray-curable inkjet printing ink composition to 25° C. Thereafter, at 25° C., precoated K- and C-liners were continuously printed using the ink composition, after which the ink composition was cured using a UV-LED lamp manufactured by Phoseon Technology with the distance between the lamp and the ink application surface adjusted to 2 cm, until the cumulative UV ray quantity reached 180 mJ/cm$_2$. Thereafter, using a conveyor-type irradiation device (Heraeus's STM-250E-16, lamp: Z-8 lamp (metal halide type)), the coated film was irradiated under the irradiation conditions of 120 W×50 m/min and 75 mJ/cm$^2$ in cumulative UV ray quantity [cumulative UV ray quantity was obtained by measuring the irradiated quantity with the measurement ranges of 250 to 260 nm, 280 to 320 nm, 320 to 390 nm, and 395 to 445 nm using EIT's UVIMAP (UM 365H-S) as a measuring instrument]. The obtained cured coating film was rubbed with a cotton swab, and curability was evaluated by how much of the coating film was removed according to the evaluation criteria below:

○: Removal is not observed.

Δ: Slight removal is observed.

X: Removal is observed.

(Curing Wrinkles)

Precoated K- and C-liners were printed with each ink composition and the printed samples were visually evaluated for presence of curing wrinkles.

○: There are no curing wrinkles.

X: There are curing wrinkles.

(Bending Tolerance Property)

Each ink composition was printed on the precoat layers of K- and C-liners formed on one side, and the liners were bent by 90 degrees with their printed surface facing outward (so that areas of the non-printed back side of the K-liner/C-liner would face each other), to evaluate bending tolerance property according to the evaluation criteria below:

○: When bent, the coating film generates no line cracks or microcracks.

Δ: When bent, the coating film generates microcracks.

X: When bent, the coating film generates line cracks.

(Rub Resistance)

Using a Gakushin-type rubbing tester (manufactured by Daiei Kagaku Seiki Mfg. Co., Ltd.), each cured film obtained in the aforementioned evaluation of curability was rubbed 200 times with a bleached cloth under a load of 500 g, to visually observe how much of the cured film is removed from the precoated K-liner/C-liner and evaluate rub resistance according to the evaluation criteria below:

○: The cured film is not removed.

Δ: Scratch marks are left on the cured film.

X: The cured film is removed, and the sheet becomes visible.

(Water Resistance)

Using a Gakushin-type rubbing tester (manufactured by Daiei Kagaku Seiki Mfg. Co., Ltd.), each cured film obtained in the aforementioned evaluation of curability was rubbed 30 times with a water-moistened, bleached cloth under a load of 500 g, to visually observe how much of the cured film is removed from the precoated K-liner/C-liner and evaluate water resistance according to the evaluation criteria below:

○: The cured film is not removed.

Δ: Scratch marks are left on the cured film.

X: The cured film is removed, and the sheet becomes visible.

(Biomass Degree)

The biomass degree is calculated by the formula below:

(Content derived from plant oil components in solids content of active energy ray-curable inkjet printing ink composition/Solids content of active energy ray-curable inkjet printing ink composition)×100

TABLE 1

| | Yellow pigment dispersion liquid 1 | Magenta pigment dispersion liquid | Cyan pigment dispersion liquid | Black pigment dispersion liquid | Orange pigment dispersion liquid | Green pigment dispersion liquid | Violet pigment dispersion liquid | Yellow pigment dispersion liquid 2 |
|---|---|---|---|---|---|---|---|---|
| P.Y. 155 | 20.0 | | | | | | | |
| P.V. 19 | | 20.0 | | | | | | |
| P.B. 15:4 | | | 20.0 | | | | | |
| P.Bl. 7 | | | | 20.0 | | | | |
| P.O. 13 | | | | | 20.0 | | | |
| P.G. 7 | | | | | | 20.0 | | |
| P.V. 23 | | | | | | | 20.0 | |
| P.Y. 150 | | | | | | | | 20.0 |
| PB822 | 8.0 | 8.0 | 8.0 | 8.0 | 8.0 | 8.0 | 8.0 | 8.0 |
| 1,6-hexanediol diacrylate | 72 | 72 | 72 | 72 | 72 | 72 | 72 | 72 |
| Total | 100 | 100 | 100 | 100 | 100 | 100 | 100 | 100 |

TABLE 2

| | | Examples | | | | | | | |
|---|---|---|---|---|---|---|---|---|---|
| | | 1 | 2 | 3 | 4 | 5 | 6 | 7 | 8 |
| Amine-modified oligomer | | 7.00 | 7.70 | 4.00 | 14.00 | 9.20 | 5.00 | 6.70 | 5.00 |
| Photopolymerizable monomer compounds | Ethoxylated (3) trimethylolpropane triacrylate | 8.00 | 8.00 | 8.00 | 8.00 | 5.00 | 8.00 | 8.00 | 8.00 |
| | Propoxylated (2) neopentyl glycol diacrylate | 2.00 | 2.00 | 2.00 | 2.00 | 10.00 | 2.00 | 2.00 | 2.00 |
| | Plant oil-derived lauryl acrylate | 15.20 | 19.00 | 13.00 | 8.00 | 8.00 | 12.30 | 15.00 | 17.00 |
| | Stearyl acrylate | | | | | | 6.00 | | |
| | Plant oil-derived 1,10-decanediol diacrylate | 23.00 | 23.00 | 23.00 | 23.00 | 23.00 | 23.00 | 23.00 | 23.00 |
| | 1,6-hexanediol diacrylate | 2.00 | | 3.50 | | | | 4.30 | 5.20 |
| | 3-methyl-1,5-pentanediol acrylate | 2.00 | 1.80 | 2.00 | 0.50 | | 8.90 | 2.00 | 2.00 |
| | Dipropylene glycol diacrylate | 3.00 | 3.00 | 3.00 | 3.00 | 3.30 | | 3.00 | 3.00 |
| | Hydroxypivalic acid neopentyl glycol diacrylate | 2.00 | 2.00 | 2.00 | 2.00 | 2.00 | | 2.00 | 2.00 |
| | 4-hydroxybutyl acrylate | 13.00 | 10.70 | 16.70 | 16.70 | 16.70 | 12.00 | 11.20 | 10.00 |
| Photopolymerization initiators | TPO | 2.00 | | 2.00 | 2.00 | 2.00 | 2.00 | 2.00 | 2.00 |
| | SB-PI719 | 2.00 | | 2.00 | 2.00 | 2.00 | 2.00 | 2.00 | 2.00 |
| | ESACURE ONE | 2.00 | 3.00 | 2.00 | 2.00 | 2.00 | 2.00 | 2.00 | 2.00 |
| | TPO-L | | 2.00 | | | | | | |
| | Omnipol TP | | 1.00 | | | | | | |
| Sensitizers | Omnipol TX | | 1.00 | | | | | | |
| | DETX | 1.00 | | 1.00 | 1.00 | 1.00 | 1.00 | 1.00 | 1.00 |
| Polymerization inhibitors | MEHQ | 1.90 | 1.90 | 1.90 | 1.90 | 1.90 | 1.90 | 1.90 | 1.90 |
| | HQ | 0.40 | 0.40 | 0.40 | 0.40 | 0.40 | 0.40 | 0.40 | 0.40 |
| Surface conditioner | BYK-331 | 0.50 | 0.50 | 0.50 | 0.50 | 0.50 | 0.50 | 0.50 | 0.50 |
| Pigment dispersion liquids | Yellow pigment dispersion liquid 1 | 13.00 | | | | | | | |
| | Magenta pigment dispersion liquid | | 13.00 | | | | | | |
| | Cyan pigment dispersion liquid | | | 13.00 | 13.00 | 13.00 | 13.00 | | |
| | Black pigment dispersion liquid | | | | | | | 13.00 | |
| | Orange pigment dispersion liquid | | | | | | | | 13.00 |
| | Green pigment dispersion liquid | | | | | | | | |
| | Violet pigment dispersion liquid | | | | | | | | |
| | Yellow pigment dispersion liquid 2 | | | | | | | | |
| Total | | | | | 100.00 | | | | |
| Viscosity (cps, 25° C.) | | 19.20 | 17.50 | 16.80 | 23.40 | 20.40 | 18.10 | 19.50 | 18.60 |
| Odor of coating film | | 5 | 5 | 5 | 5 | 5 | 5 | 5 | 5 |
| Storage stability | | ○ | ○ | ○ | ○ | ○ | ○ | ○ | ○ |
| Discharge stability | | ○ | ○ | ○ | ○ | ○ | ○ | ○ | ○ |
| Curability | | ○ | ○ | ○Δ | ○ | ○ | ○ | ○ | ○ |
| Curing wrinkles | | ○ | ○ | ○ | ○ | ○ | ○ | ○ | ○ |
| Bending tolerance property | | ○ | ○ | ○ | ○ | ○ | ○ | ○ | ○ |
| Rub resistance | | ○ | ○ | ○ | ○ | ○ | ○ | ○ | ○ |
| Water resistance | | ○ | ○ | ○ | ○ | ○ | ○ | ○ | ○ |
| Biomass degree | | 20 or higher | 20 or higher | 20 or higher | 20 or higher | 20 or higher | 20 or higher | 20 or higher | 20 or higher |

| | | Examples | | | Comparative Examples | | | | |
|---|---|---|---|---|---|---|---|---|---|
| | | 9 | 10 | 11 | 1 | 2 | 3 | 4 | 5 |
| Amine-modified oligomer | | 10.50 | 9.20 | 10.50 | 0.00 | 22.00 | 9.20 | 9.20 | 5.00 |
| Photopolymerizable monomer compounds | Ethoxylated (3) trimethylolpropane triacrylate | 8.00 | 8.00 | 8.00 | 8.00 | 8.00 | 8.00 | 8.00 | 15.00 |
| | Propoxylated (2) neopentyl glycol diacrylate | 2.00 | 2.00 | 2.00 | 2.00 | 2.00 | 2.00 | 2.00 | 10.00 |
| | Plant oil-derived lauryl acrylate | 14.60 | 15.30 | 14.60 | 11.00 | 10.00 | 1.00 | 28.00 | 6.00 |
| | Stearyl acrylate | | | | | | | | |
| | Plant oil-derived 1,10-decanediol diacrylate | 23.00 | 23.00 | 23.00 | 23.00 | 23.00 | 33.30 | 18.00 | 25.00 |
| | 1,6-hexanediol diacrylate | 4.10 | 2.70 | 4.10 | 25.50 | 0.50 | | | |
| | 3-methyl-1,5-pentanediol acrylate | 2.00 | 2.00 | 2.00 | 2.70 | | 2.00 | 2.00 | 11.20 |
| | Dipropylene glycol diacrylate | 3.00 | 3.00 | 3.00 | | | 3.00 | 3.00 | |
| | Hydroxypivalic acid neopentyl glycol diacrylate | 2.00 | 2.00 | 2.00 | | | 2.00 | 2.00 | |
| | 4-hydroxybutyl acrylate | 8.00 | 10.00 | 8.00 | 5.00 | 11.70 | 16.70 | 5.00 | 5.00 |
| Photopolymerization initiators | TPO | 2.00 | 2.00 | 2.00 | 2.00 | 2.00 | 2.00 | 2.00 | 2.00 |
| | SB-PI719 | 2.00 | 2.00 | 2.00 | 2.00 | 2.00 | 2.00 | 2.00 | 2.00 |
| | ESACURE ONE | 2.00 | 2.00 | 2.00 | 2.00 | 2.00 | 2.00 | 2.00 | 2.00 |
| | TPO-L | | | | | | | | |
| | Omnipol TP | | | | | | | | |

TABLE 2-continued

| | | | | | | | | | |
|---|---|---|---|---|---|---|---|---|---|
| Sensitizers | Omnipol TX | | | | | | | | |
| | DETX | 1.00 | 1.00 | 1.00 | 1.00 | 1.00 | 1.00 | 1.00 | 1.00 |
| Polymerization | MEHQ | 1.90 | 1.90 | 1.90 | 1.90 | 1.90 | 1.90 | 1.90 | 1.90 |
| inhibitors | HQ | 0.40 | 0.40 | 0.40 | 0.40 | 0.40 | 0.40 | 0.40 | 0.40 |
| Surface conditioner | BYK-331 | 0.50 | 0.50 | 0.50 | 0.50 | 0.50 | 0.50 | 0.50 | 0.50 |
| Pigment dispersion | Yellow pigment dispersion liquid 1 | | | | | | | | |
| liquids | Magenta pigment dispersion liquid | | | | | | | | |
| | Cyan pigment dispersion liquid | | | | 13.00 | 13.00 | 13.00 | 13.00 | 13.00 |
| | Black pigment dispersion liquid | | | | | | | | |
| | Orange pigment dispersion liquid | | | | | | | | |
| | Green pigment dispersion liquid | 13.00 | | | | | | | |
| | Violet pigment dispersion liquid | | 13.00 | | | | | | |
| | Yellow pigment dispersion liquid 2 | | | 13.00 | | | | | |
| Total | | | | | 100.00 | | | | |
| Viscosity (cps, 25° C.) | | 18.60 | 19.50 | 19.30 | 13.50 | 25.70 | 22.80 | 19.30 | 23.00 |
| Odor of coating film | | 5 | 5 | 5 | 5 | 5 | 5 | 5 | 5 |
| Storage stability | | ○ | ○ | ○ | ○ | ΔX | ○ | X | ○ |
| Discharge stability | | ○ | ○ | ○ | ○ | X | ○ | ○ | ○ |
| Curability | | ○ | ○ | ○ | X | ○ | ○ | ○ | ○ |
| Curing wrinkles | | ○ | ○ | ○ | ○ | ○ | ○ | X | ○ |
| Bending tolerance property | | ○ | ○ | ○ | X | ○ | X | ○ | ○ |
| Rub resistance | | ○ | ○ | ○ | X | ○ | ○ | X | ○ |
| Water resistance | | ○ | ○ | ○ | ○ | ○ | ○ | ○ | X |
| Biomass degree | | 20 or higher | 20 or higher | 20 or higher | 20 or higher | 20 or higher | 20 or higher | 20 or higher | 20 or higher |

According to the Examples that represent examples conforming to the present invention, active energy ray-curable inkjet printing ink compositions were obtained that are characterized in that the ink composition has low viscosity and no odor, demonstrates excellent storage stability, discharge stability, and curability, and generates no curing wrinkles when cured, while the cured coating film exhibits excellent bending tolerance property, rub resistance, and water resistance, along with high degree of biomass.

However, Comparative Example 1 containing no amine-modified oligomer but containing an excessive amount of requirement D component resulted in poor curability, bending tolerance property, and rub resistance, while Comparative Example 2 containing an excessive amount of amine-modified oligomer and an insufficient amount of requirement D component led to high viscosity along with poor storage stability and discharge stability.

Comparative Example 3 characterized by a low content of requirement C component showed poor bending tolerance property, while Comparative Example 4 characterized by an excessive content of requirement C component had poor storage stability, generated curing wrinkles, and exhibited poor rub resistance.

Also, Comparative Example 5 characterized by an excessive amount of requirement B component produced a coating film with poor water resistance.

What is claimed:

1. An active energy ray-curable inkjet printing ink composition satisfying requirements (A) to (E) below, where a total content of compounds in (D) and (E) accounts for 30.0 to 60.0% by mass in the active energy ray-curable inkjet printing ink composition:

(A) an acrylated amine compound having two photopolymerizable functional groups and two amino groups in a molecule is contained by 1.0 to 20.0% by mass in the active energy ray-curable inkjet printing ink composition;

(B) alkoxy group-containing (meth)acrylate monomers are contained by 2.0 to 20.0% by mass in the active energy ray-curable inkjet printing ink composition;

(C) a (meth)acrylate monomer containing an alkyl group with 10 to 20 carbon atoms is contained by 2.0 to 25.0% by mass in the active energy ray-curable inkjet printing ink composition;

(D) at least one type selected from a group that consists of 1,6-hexanediol diacrylate, 3-methyl-1,5-pentanediol diacrylate, dipropylene glycol diacrylate, propoxylated (2) neopentyl glycol diacrylate and hydroxypivalic acid neopentyl glycol diacrylate is contained by 5.0 to 25.0% by mass in the active energy ray-curable inkjet printing ink composition;

(E) a plant oil-derived 1,10-decanediol diacrylate is contained by 10.0 to 40.0% by mass in the active energy ray-curable inkjet printing ink composition.

2. The active energy ray-curable inkjet printing ink composition according to claim 1, wherein 50 to 100% by mass of the alkoxy group-containing (meth)acrylate monomers in (B) are polyfunctional alkoxy (meth)acrylate monomers.

3. The active energy ray-curable inkjet printing ink composition according to claim 1, containing a (F) photopolymerization initiator.

4. The active energy ray-curable inkjet printing ink composition according to claim 1, wherein the (F) photopolymerization initiator comprises one or more types selected from 2,4,6-trimethylbenzyl-diphenylphosphine oxide, ethoxy(2,4,6-trimethylbenzoyl)phenylphosphine oxide, bis (2,4,6-trimethylbenzoyl)phenylphosphine oxide, oligo{2-hydroxy-2-methyl-1-[4-(1-methylvinyl)phenyl]propanone}, polymer-type initiators, and bis[4-(2-hydroxy-2-methylpropanoyl)phenyl]ether.

5. The active energy ray-curable inkjet printing ink composition according to claim 1, wherein (G) hydroxyl group-containing (meth)acrylate monomers are contained by 3.0 to 20.0% by mass in the active energy ray-curable inkjet printing ink composition.

6. The active energy ray-curable inkjet printing ink composition according to claim 1, wherein the (C) (meth) acrylate monomer having an alkyl group with 10 to 20 carbon atoms is a plant oil-derived lauryl acrylate.

7. The active energy ray-curable inkjet printing ink composition according to claim 1, containing a (H) colorant.

8. The active energy ray-curable inkjet printing ink composition according to claim 2, containing a (F) photopolymerization initiator.

9. The active energy ray-curable inkjet printing ink composition according to claim 2, wherein the (F) photopolymerization initiator comprises one or more types selected from 2,4,6-trimethylbenzyl-diphenylphosphine oxide, ethoxy(2,4,6-trimethylbenzoyl)phenylphosphine oxide, bis (2,4,6-trimethylbenzoyl)phenylphosphine oxide, oligo{2-hydroxy-2-methyl-1-[4-(1-methylvinyl)phenyl] propanone}, polymer-type initiators, and bis[4-(2-hydroxy-2-methylpropanoyl)phenyl] ether.

10. The active energy ray-curable inkjet printing ink composition according to claim 2, wherein (G) hydroxyl group-containing (meth)acrylate monomers are contained by 3.0 to 20.0% by mass in the active energy ray-curable inkjet printing ink composition.

11. The active energy ray-curable inkjet printing ink composition according to claim 2, wherein the (C) (meth) acrylate monomer having an alkyl group with 10 to 20 carbon atoms is a plant oil-derived lauryl acrylate.

12. The active energy ray-curable inkjet printing ink composition according to claim 2, containing a (H) colorant.

13. The active energy ray-curable inkjet printing ink composition according to claim 3, wherein the (F) photopolymerization initiator comprises one or more types selected from 2,4,6-trimethylbenzyl-diphenylphosphine oxide, ethoxy(2,4,6-trimethylbenzoyl)phenylphosphine oxide, bis(2,4,6-trimethylbenzoyl)phenylphosphine oxide, oligo{2-hydroxy-2-methyl-1-[4-(1-methylvinyl)phenyl]

propanone}, polymer-type initiators, and bis[4-(2-hydroxy-2-methylpropanoyl)phenyl]ether.

14. The active energy ray-curable inkjet printing ink composition according to claim 3, wherein (G) hydroxyl group-containing (meth)acrylate monomers are contained by 3.0 to 20.0% by mass in the active energy ray-curable inkjet printing ink composition.

15. The active energy ray-curable inkjet printing ink composition according to claim 3, wherein the (C) (meth) acrylate monomer having an alkyl group with 10 to 20 carbon atoms is a plant oil-derived lauryl acrylate.

16. The active energy ray-curable inkjet printing ink composition according to claim 3, containing a (H) colorant.

17. The active energy ray-curable inkjet printing ink composition according to claim 4, wherein (G) hydroxyl group-containing (meth)acrylate monomers are contained by 3.0 to 20.0% by mass in the active energy ray-curable inkjet printing ink composition.

18. The active energy ray-curable inkjet printing ink composition according to claim 4, wherein the (C) (meth) acrylate monomer having an alkyl group with 10 to 20 carbon atoms is a plant oil-derived lauryl acrylate.

19. The active energy ray-curable inkjet printing ink composition according to claim 4, containing a (H) colorant.

20. The active energy ray-curable inkjet printing ink composition according to claim 5, wherein the (C) (meth) acrylate monomer having an alkyl group with 10 to 20 carbon atoms is a plant oil-derived lauryl acrylate.

\* \* \* \* \*